(12) United States Patent
Saeki (10) Patent No.: US 10,051,574 B2
(45) Date of Patent: Aug. 14, 2018

(54) BASE STATION, TERMINAL DEVICE, AND CORE NETWORK DEVICE

(71) Applicant: NEC Corporation, Minato-ku, Tokyo (JP)

(72) Inventor: Tomoyuki Saeki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/441,450

(22) Filed: Feb. 24, 2017

(65) Prior Publication Data

US 2017/0265138 A1 Sep. 14, 2017

(30) Foreign Application Priority Data

Mar. 11, 2016 (JP) .................. 2016-047698

(51) Int. Cl.
| | |
|---|---|
| *H04W 8/08* | (2009.01) |
| *H04W 52/02* | (2009.01) |
| *H04W 48/16* | (2009.01) |
| *H04W 64/00* | (2009.01) |
| *H04W 88/02* | (2009.01) |
| *H04W 88/08* | (2009.01) |
| *H04W 8/20* | (2009.01) |
| *H04W 36/22* | (2009.01) |

(52) U.S. Cl.
CPC ......... *H04W 52/0229* (2013.01); *H04W 8/08* (2013.01); *H04W 48/16* (2013.01); *H04W 64/00* (2013.01); *H04W 8/20* (2013.01); *H04W 36/22* (2013.01); *H04W 88/02* (2013.01); *H04W 88/08* (2013.01); *Y02D 70/1262* (2018.01); *Y02D 70/1264* (2018.01); *Y02D 70/164* (2018.01)

(58) Field of Classification Search
CPC ... H04W 52/0229; H04W 8/08; H04W 64/00; H04W 48/16; H04W 88/02; H04W 88/08
See application file for complete search history.

(56) References Cited

U.S. PATENT DOCUMENTS

| | | | | |
|---|---|---|---|---|
| 2010/0041384 | A1* | 2/2010 | Kazmi | H04W 48/16 455/419 |
| 2014/0274184 | A1* | 9/2014 | Regan | H04W 48/16 455/515 |
| 2015/0264637 | A1* | 9/2015 | Zaus | H04W 48/16 455/434 |
| 2016/0269218 | A1* | 9/2016 | Zhang | H04L 27/3488 |

FOREIGN PATENT DOCUMENTS

JP    2010-081437 A    4/2010

* cited by examiner

*Primary Examiner* — Chuong A Ngo (57) ABSTRACT

The base station of the present invention is a base station that wirelessly communicates with a terminal device. The base station includes: a reception unit for receiving first information relating to mobility of the terminal device; a determination unit for determining second information relating to scanning of base stations based on the first information; and a transmission unit for transmitting the second information to the terminal device.

9 Claims, 8 Drawing Sheets

BASE STATION, TERMINAL DEVICE, AND CORE NETWORK DEVICE

This application is based upon and claims the benefit of priority from Japanese Patent Application No. 2016-168520, filed on Mar. 11, 2016, the disclosure of which is incorporated herein in its entirety by reference.

TECHNICAL FIELD

The present invention relates to a base station, a terminal device, and a core network device that perform wireless communications.

BACKGROUND ART

In a wireless communication system, a terminal device wirelessly communicates with other terminal devices through base stations and a core network.

Figure 1:
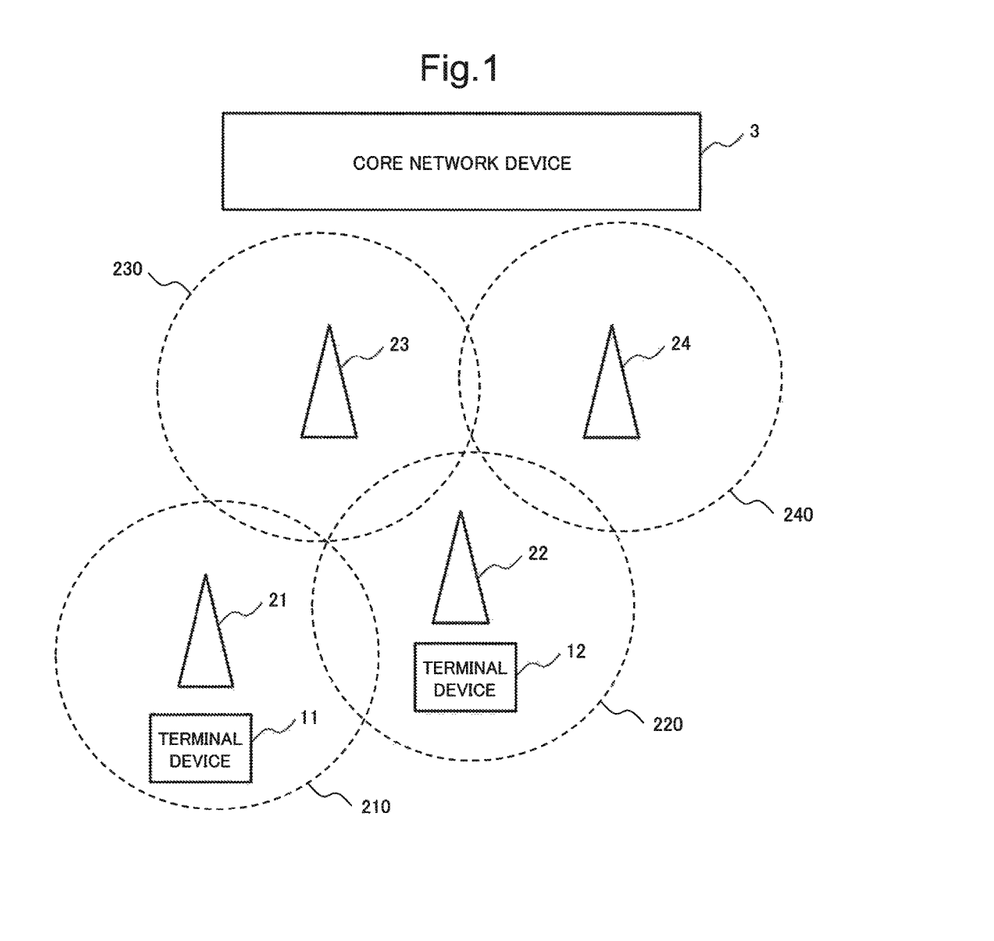
FIG. 1 is a block diagram illustrating a configuration example of a general communication system.

FIG. 1 illustrates a configuration example of a general wireless communication system. Base stations 21 to 24 respectively form cells 210 to 240, which range within a reach of radio waves emitted from the base stations 21 to 24.

A terminal device 11 is located in the area of the cell 210 formed by the base station 21. In addition, the terminal device 11 wirelessly communicates with another terminal device 12 via the base station 21 that is emitting the strongest signals to the terminal device 11. When calling the terminal device 12, the terminal device 11 first transmits a radio frequency (RF) signal to the base station 21. The terminal device 12 is located in the area of the cell 220 formed by the base station 22. The base station 21 routes the RF signal to the base station 22 that is emitting the strongest signals to the terminal device 12 via a core network device 3. Then, the base station 22 transmits the RF signal to the terminal device 12.

Here, when the terminal device 11 moves, for example, the base station emitting the strongest signals to the terminal device 11 may not remain as the base station 21. For example, when the movement of the terminal device 11 causes the cell located within the area of the terminal device 11 to be changed from the cell 210 to the cell 230, the base station 23 becomes the base station emitting the strongest signals to the terminal device 11.

Thus, the terminal device 11 searches whether there is a base station that emits stronger signals than the base station 21 with which the terminal device 11 has been communicating previously. This is called scanning. As the result of scanning, when there is a base station that emits stronger signals than the base station with which the terminal device has been communicating previously, the terminal device establishes a communication channel between a newly found base station.

Meanwhile, in the scanning operation, the terminal device receives signals from base stations through a control channel (for example, a broadcast channel) between the terminal device and the base stations. The terminal device then recognizes the identifiers of connectable base stations (CSID: cell station identifier) and the received signal strength indicators (RSSI). The terminal device periodically performs scanning operation except when the communication quality is degraded or the like. Accordingly, the terminal device consumes the battery for scanning.

With regard to this matter, Japanese Patent Application Laid-open Publication No. 2010-81437 discloses that a terminal device determines the necessity of scanning and does not perform unnecessary scanning.

According to Japanese Patent Application Laid-open Publication No. 2010-81437, a displacement amount calculator equipped in a terminal device calculates the displacement amount of the radio communication terminal. When the displacement amount is a predetermined value or less, a scan stopper equipped in the radio communication terminal suppresses scanning of base stations in the vicinity. In the technique of Japanese Patent Application Laid-open Publication No. 2010-81437, a terminal device determines the necessity of scanning and the operation of the determination also consumes power.

SUMMARY

In view of the above-described problem, an example object of the present invention is to let a base station determine the necessity of scanning according to a condition so as to save power consumed by a terminal device for unnecessary scanning and for determining the necessity of scanning.

The base station of an example aspect of the present invention is a base station that wirelessly communicates with a terminal device. The base station is characterized by including: a reception unit for receiving first information relating to mobility of the terminal device; a determination unit for determining second information relating to scanning of base stations based on the first information; and a transmission unit for transmitting the second information to the terminal device.

BRIEF DESCRIPTION OF THE DRAWINGS

Exemplary features and advantages of the present invention will become apparent from the following detailed description when taken with the accompanying drawings in which.

EXAMPLE EMBODIMENT

In the following, example embodiments of the present invention will be described in detail with reference to the drawings.

As described above, FIG. 1 is a block diagram illustrating a configuration example of a general communication system. The communication system in the example embodiments of the present invention also has a general configuration as FIG. 1.

(A First Example Embodiment)

Figure 2:
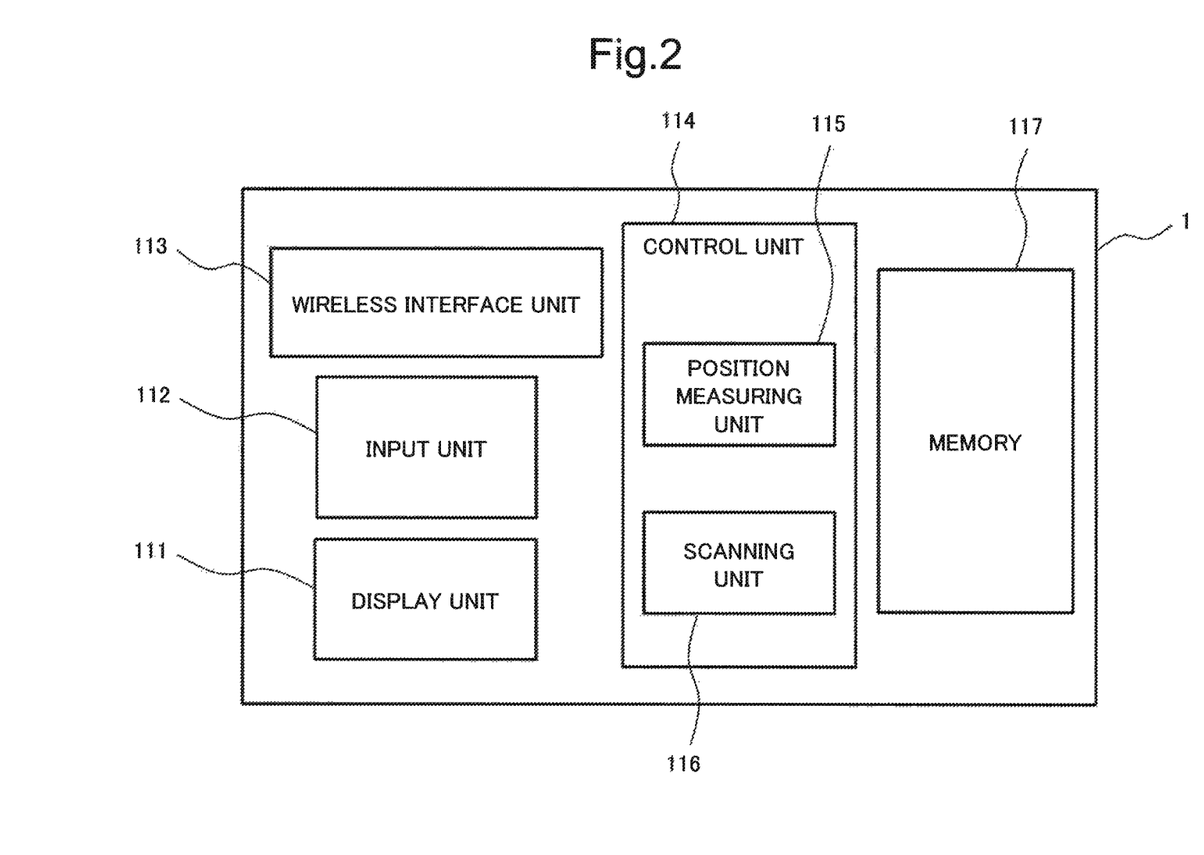
FIG. 2 is a block diagram illustrating an example of a configuration of a terminal device 1 according to an example embodiment of the present invention.

FIG. 2 is a block diagram illustrating an example of a configuration of a terminal device 1 according to an example embodiment of the present invention. The terminal device 1 has a display unit 111, an input unit 112, a wireless interface unit 113, a control unit 114, and a memory 117. The control unit 114 has a position measuring unit 115 and a scanning unit 116.

A user inputs information to the input unit 112 according to a content displayed on the display unit 111. The input information is transmitted to the control unit 114 and registered to the memory 117.

The terminal device 1 transmits and receives signals to and from a base station 2 via the wireless interface unit 113. The terminal device 1 transmits and receives signals to and from the core network device 3 via the base station 2 from the wireless interface unit 113. The terminal device 1 receives signals from the base station 2 and transmits the signals to the control unit 114. The scanning unit 116 performs scanning according to the content indicated by the received signals.

The position measuring unit 115 measures the position of the terminal device 1 and acquires the information relating to the position of the terminal device 1. The position of the terminal device 1 may be measured by a Global Positioning System (GPS). A method using the GPS includes, for example, a method using a Global Navigation Satellite System (GNSS). In such a case, a GPS signal reception unit (not illustrated) equipped in the terminal device 1 receives GPS signals from a GPS satellite. Then, the position measuring unit 115 measures the position of the terminal device 1. Specifically, this position may be the longitude and latitude of an area where the terminal device 1 is located.

Further, the position measuring unit 115 may use the position of a base station (a cell range) to which the terminal device 1 is connected, as a present position and estimate the position of the terminal device 1 from the present position. In such a case, the position measuring unit 115 may use the cell identifier (ID) of the base station to which the terminal device 1 is connected.

Further, the position measuring unit 115 may measure the position of the terminal device 1 based on the intensities of signals received from base stations by referring a preset radio wave map. The radio wave map may indicate, for example, relationships between the intensities of signals that the terminal device 1 receives from base stations and distances between the terminal device 1 and the base stations.

Further, the position measuring unit 115 may measure the position of the terminal device 1 based on the timing of receiving signals from base stations. The radio wave map may also be used in this case. This method includes, for example, a method using observed time difference of arrival (OTDOA).

In addition, the position measuring unit 115 may measure the position of the terminal device 1 based on the angles of signals received from base stations. The radio wave map may also be used in this case. This method includes, for example, a method using enhanced-cell identifier (E-CID).

The memory 117 may store information relating to the position of the terminal device 1 that the position measuring unit 115 acquired, as well as information relating to the user. Further, the memory 117 may store the GPS signals, the cell IDs of base stations, the radio wave map, the intensities of signals received from the base stations, and the like that is used when the position measuring unit 115 measures positions.

The memory 117 may store a preset threshold for mobility of the terminal device 1. In such a case, the control unit 114 may calculate the degree of the mobility of the terminal device 1 based on information relating to the position of the terminal device 1 measured by the position measuring unit 115. The control unit 114 may then compare the calculated degree of mobility with the preset threshold. Here, the position measuring unit 115 may acquire information relating to the measured position of the terminal device 1 for a plurality of times. The control unit 114 may calculate the degree of the mobility of the terminal device 1 based on the history of the information relating to the position of the terminal device 1.

As the result of comparison by the control unit 114, when the degree of the mobility of the terminal device 1 is equal to or less than the preset threshold, information indicating that the terminal device 1 is low mobility may be stored in the memory 117.

Further, information indicating that the terminal device 1 is low mobility may also be stored in the memory 117 when the control unit 114 determines that a change in the position of the terminal device 1 is equal to or less than a specific value from the history of information relating to the position of the terminal device 1.

It should be noted that the information indicating that the terminal device 1 is low mobility may be input to the memory 117 in advance.

The memory 117 may store a variety of information relating to the mobility of the terminal device 1, such as information indicating the degree of the mobility of the terminal device 1.

Figure 3:
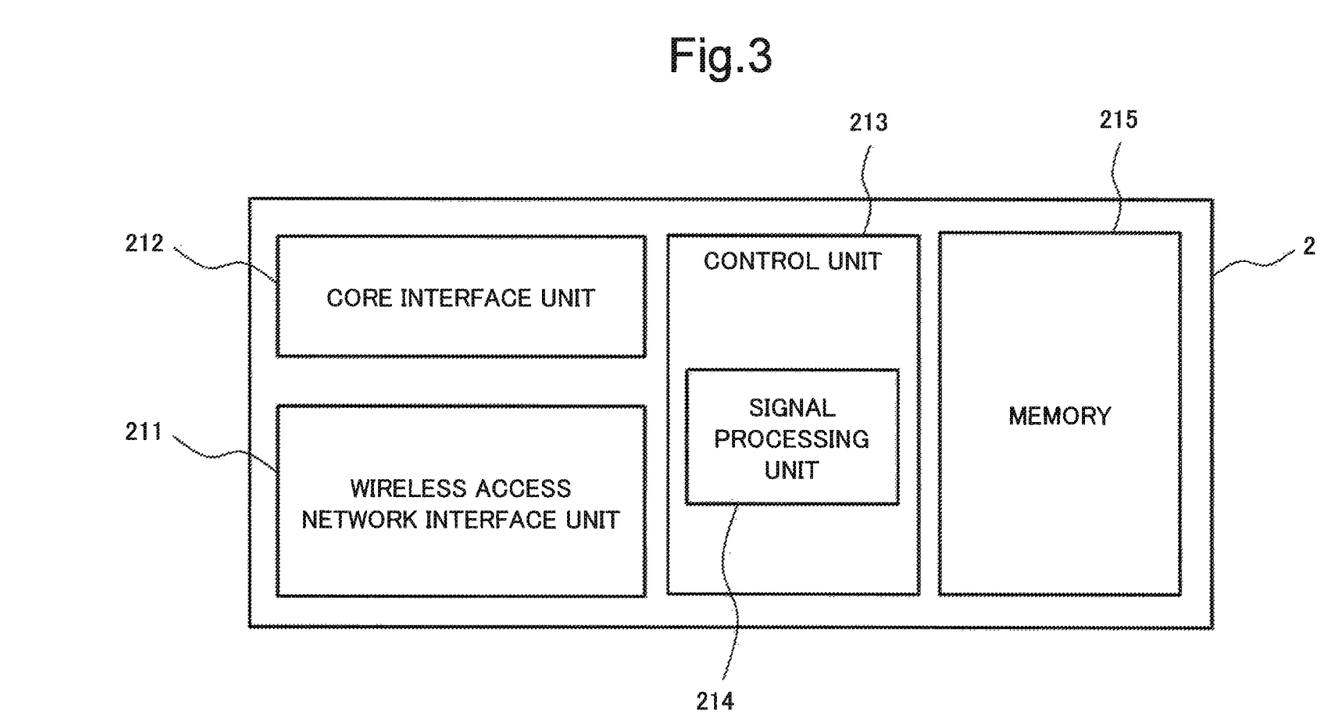
FIG. 3 is a block diagram illustrating an example of a configuration of a base station 2 according to an exemplary embodiment of the present invention.

FIG. 3 is a block diagram illustrating an example of a configuration of the base station 2 according to an example embodiment of the present invention. The base station 2 has a wireless access network interface unit 211, a core interface unit 212, a control unit 213, and a memory 215. The control unit 213 has a signal processing unit 214.

The base station 2 transmits and receives signals to and from the terminal device 1, other base stations, and the core network device 3 via the wireless access network interface unit 211 and the core interface unit 212. The wireless access network interface unit 211 and the core interface unit 212 may be configured, for example, using a Radio Frequency (RF) circuit, a Base Band (BB) circuit, or the like. Further, the wireless access network interface unit 211 and the core interface unit 212 may modulate/encode transmission signals and demodulate/decode reception signals.

The signal processing unit 214 of the control unit 213 generates a variety of signals that are transmitted via each of the interface units 211 and 212.

The memory 215 may store a variety of signals that are transmitted to the terminal device 1 and the core network device 3 via each of the interface units 211 and 212. Further, the memory 215 may store a variety of signals that are received from the terminal device 1 and the core network device 3 via each of the above interface units 211 and 212.

Figure 5:
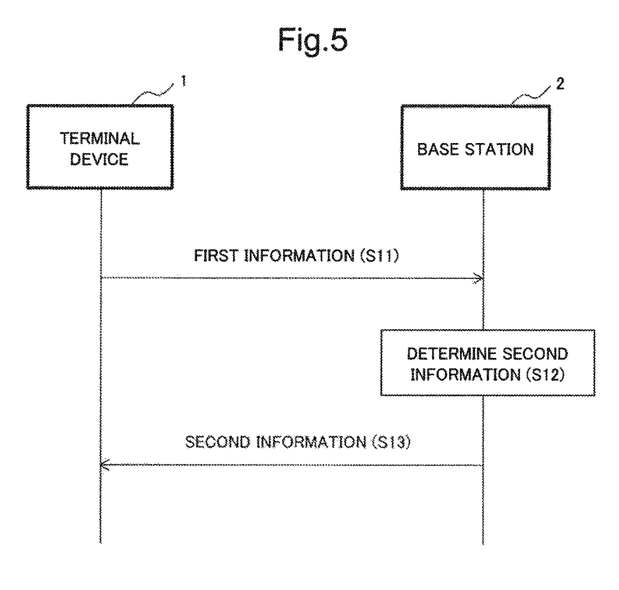
FIG. 5 is a sequence diagram illustrating operation according to an example embodiment of the present invention.

In the following, the operation according to the first example embodiment will be described using the sequence diagram of FIG. 5.

First, the terminal device 1 transmits first information relating to the mobility of the terminal device 1 to the base station 2 (S11).

The first information may be information indicating the degree of the mobility of the terminal device 1 as described above. Alternatively, the first information may be information indicating that the degree of the mobility of the terminal device 1 is equal to or less than a preset threshold, in other words, the terminal device 1 is low mobility. Further, the first information may be information relating to the position of the terminal device 1. It should be noted that, when the first information is information relating to the position of the terminal device 1, the base station 2 may receive the first information from the terminal device 1 for a plurality of times. The base station 2 may then calculate the degree of the mobility of the terminal device 1 based on the history information of the information relating to the position of the terminal device 1.

Next, the base station 2 determines second information relating to scanning of base stations based on the received first information (S12).

The second information may be information for instructing the terminal device 1 to scan base stations. On the other hand, the second information may be information for instructing not to scan base stations. Further, the second information may be information for instructing the terminal device 1 not to transmit a specific message to base stations.

Here, when the first information indicates that the degree of the mobility of the terminal device 1 is equal to or less than a preset threshold, the second information may be information for instructing not to scan base stations.

On the other hand, when the first information indicates that the degree of the mobility of the terminal device 1 is larger than a preset threshold, the second information may be information for instructing to scan base stations.

However, even when the displacement amount of the terminal device 1 is equal to or less than a predetermined value, the terminal device 1 may sometimes be required to scan base stations. For example, assume that the cell of the base station 2, to which the terminal device 1 is connected, is congested. In such a case, the terminal device 1 can avoid congestion by performing handover from the congested cell to another cell, for example, to an overlay cell. In such a condition, the base station 2 can instruct the terminal device 1 to scan base stations of other cells. Thus, even when the first information indicates that the degree of the mobility of the terminal device 1 is equal to or less than a preset threshold, depending on the condition, the base station 2 can determine information for instructing to scan other base stations as the second information. In this way, without unconditionally suppressing scanning by the terminal device 1 that was determined as low mobility, the base station 2 can determine the necessity of scanning according to the condition and flexibly issue an instruction on scanning to the terminal device 1. Next, the base station 2 transmits the determined second information to the terminal device 1 (S13). In this way, the terminal device 1 can receive, from the base station 2, information relating to scanning of base stations that is determined based on information relating to the mobility of the terminal device 1 itself.

According to the first example embodiment, the terminal device 1 can get a trigger of operation relating to scanning of base stations according to information relating to the mobility of the terminal device 1 itself or according to a variety of conditions without consuming power for determining information relating to scanning of base stations.

(A Second Example Embodiment)

In a second example embodiment, second information is included in a wireless setting request message to be transmitted from the base station 2 to the terminal device 1.

Further, in the second example embodiment, the core network device 3 is used in addition to the terminal device 1 and base station 2 that have been described in the first example embodiment.

Figure 4:
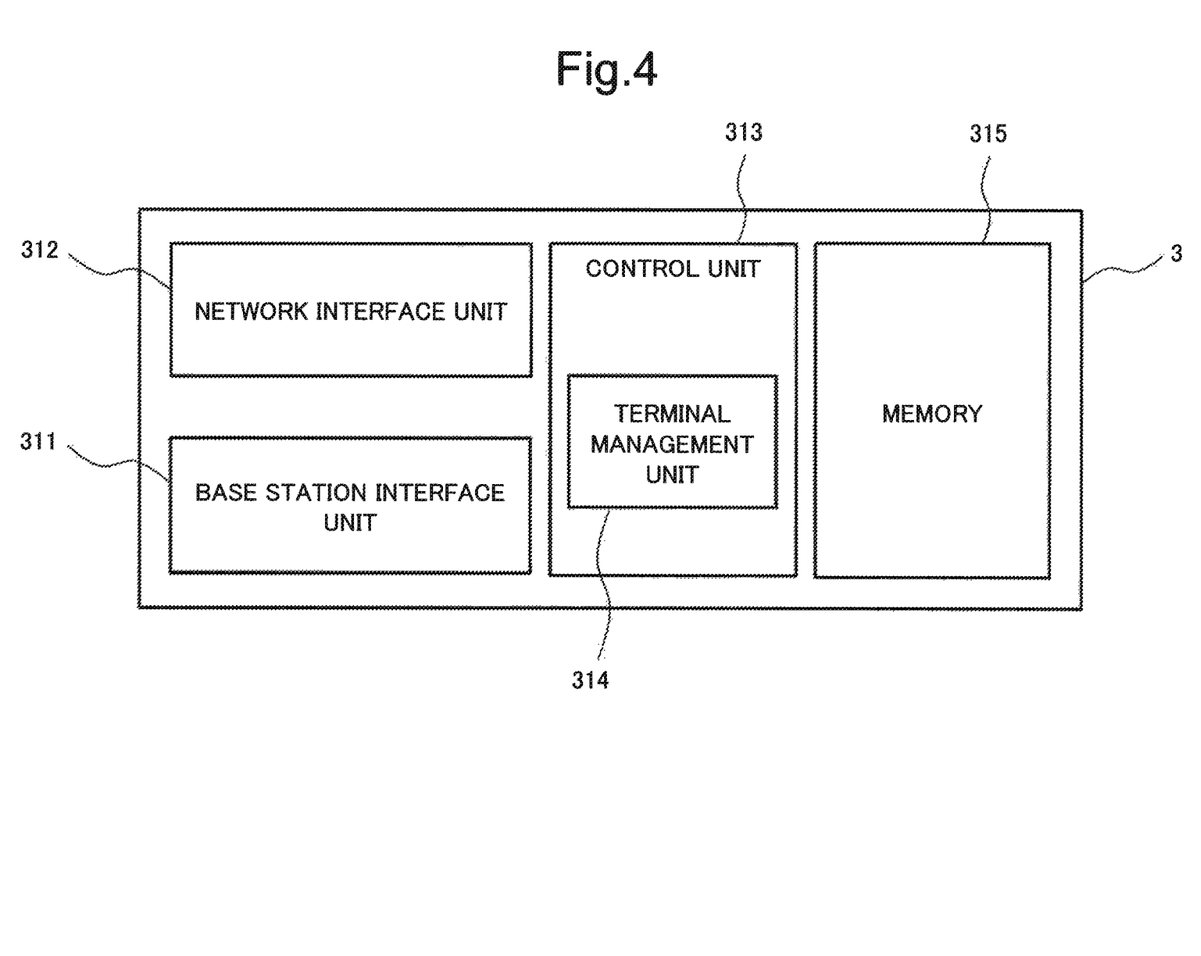
FIG. 4 is a block diagram illustrating an example of a configuration of a core network device 3 according to an example embodiment of the present invention.

FIG. 4 is a block diagram illustrating an example of a configuration of the core network device 3 according to an example embodiment of the present invention.

The core network device 3 has a base station interface unit 311, a network interface unit 312, a control unit 313, and a memory 315. The control unit 313 has a terminal management unit 314.

The core network device 3 transmits and receives signals to and from the base station 2 via the base station interface unit 311. The core network device 3 transmits and receives signals to and from the terminal device 1 via the base station 2 from the base station interface unit 311. Further, the core network device 3 is connected to an external network, such as the Internet, via the network interface unit 312.

The control unit 313 reads information relating to the position and mobility of the terminal device 1 based on the signals received from the terminal device 1. Then, the terminal management unit 314 manages information relating to the terminal device 1.

A variety of information relating to the terminal device 1 and the base station 2 may be stored in the memory 315.

Figure 6:
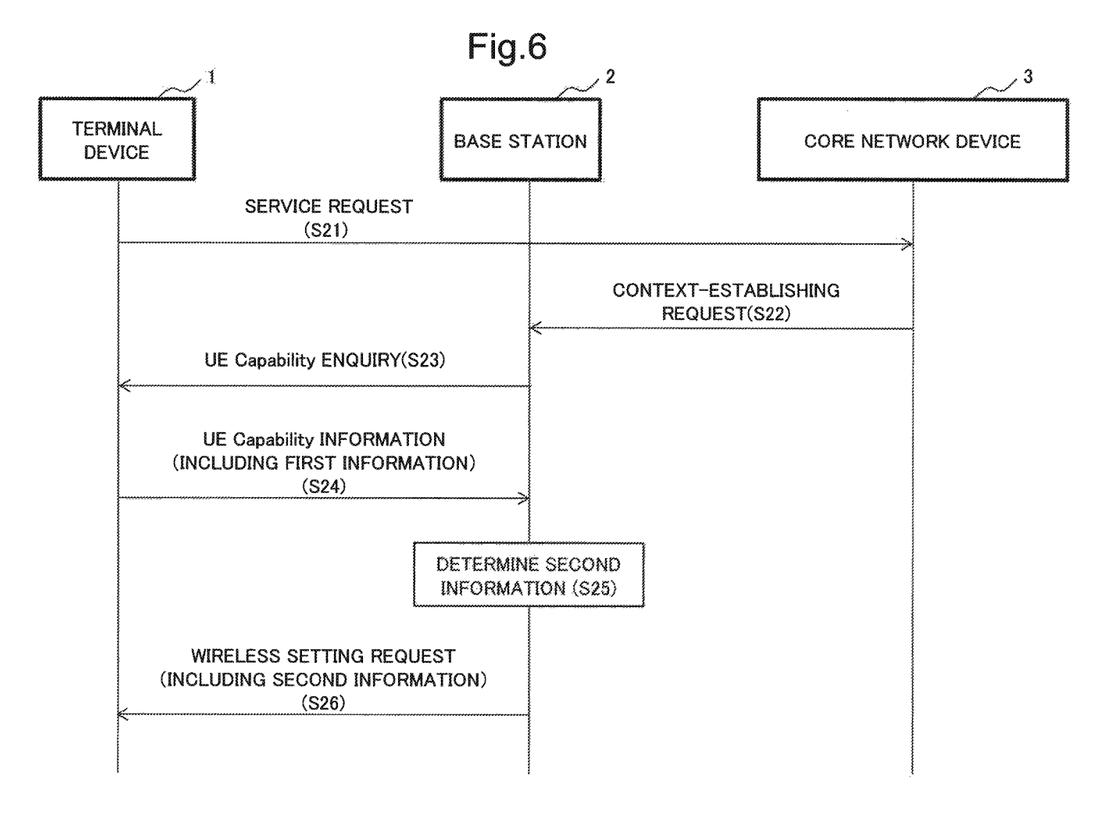
FIG. 6 is a sequence diagram illustrating operation according to an example embodiment of the present invention.

The operation according to the second example embodiment will be described using the sequence diagram of FIG. 6.

First, the terminal device 1 issues a service request to the core network device 3 (S21).

Next, the core network device 3 transmits a context-establishing request message to the base station 2 (S22). This message is transmitted for setting a necessary initial context of the terminal device 1. The initial context of the terminal device 1 includes, for example, an E-UTRAN Radio Access Bearer (E-RAB) Context, a Security Key, a Handover Restriction List, User Equipment (UE) Radio Capability, UE Security Capabilities, and the like. It should be noted that this message may be an Initial Context Setup Request message or an Attach Accept message.

Subsequently, the base station 2 transmits an UE Capability Enquiry message to the terminal device 1 (S23). The base station 2 transmits this message in order to know the communication capability of the terminal device 1.

Then, the terminal device 1 transmits an UE Capability Information message to the base station 2 (S24). In the second example embodiment, the terminal device 1 includes the first information in this message. The first information according to the second example embodiment is the same as the first information described in the first example embodiment.

Next, the base station 2 determines second information based on the first information (S25). The second information according to the second example embodiment is the same as the second information described in the first example embodiment.

The base station 2 transmits a wireless setting request message to the terminal device 1 (S26). In the second example embodiment, the base station 2 includes the second information in this message. This message may be a Radio Resource Control (RRC) Connection Reconfiguration message.

It should be noted that the RRC Connection Reconfiguration message is used for setting, changing, cancelling of a wireless bearer, execution of handover, and setting, changing, cancelling and the like of measurement by the terminal device 1.

According to the second example embodiment, the terminal device 1 can get a trigger of operation relating to scanning of base stations without consuming power for determining information relating to scanning of base stations. This can be done at a timing of receiving a wireless setting request message from the base station 2, according to information relating to the mobility of the terminal device 1 itself or according to a variety of conditions.

(A Third Example Embodiment)

Figure 7:
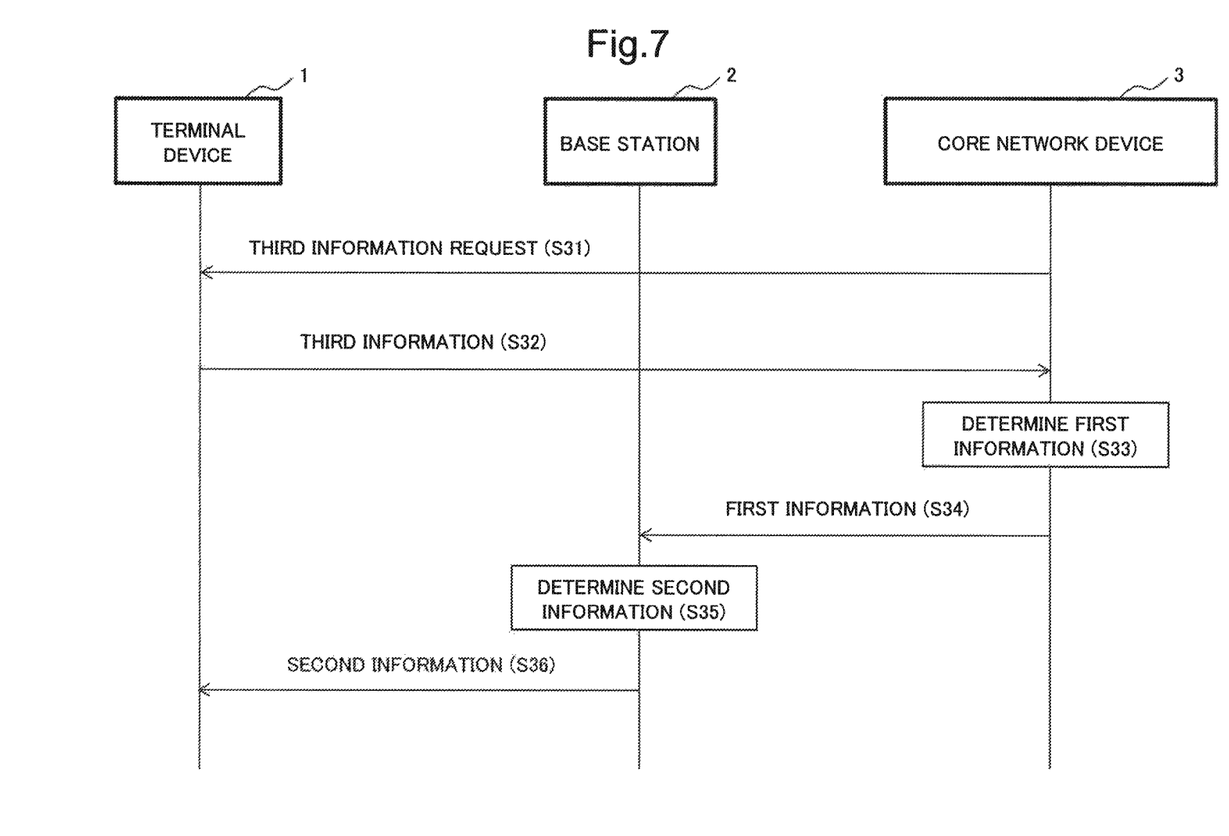
FIG. 7 is a sequence diagram illustrating operation according to an example embodiment of the present invention.

The operation according to a third example embodiment will be described using the sequence diagram of FIG. 7.

In the third example embodiment, the first information is transmitted to the base station 2 from the core network device 3, not from the terminal device 1.

First, the core network device 3 can request the terminal device 1 to transmit third information relating to the position of the terminal device 1 (S31). The core network device 3 can periodically issue this request to the terminal device 1. In such a case, the number of times and timing that the core network device 3 issues a request to the terminal device 1 can be set appropriately.

The third information may be information relating to the position of the terminal device 1 that is measured by the position measuring unit 115 of the terminal device 1 as described in the first example embodiment, or information used by the position measuring unit 115 for measuring the position. Further, the third information may be information relating to the mobility of the terminal device 1.

Next, the terminal device 1 transmits the third information to the core network device 3 (S32). Here, the terminal device 1 may autonomously transmit the third information to the core network device 3 without being requested the third information from the core network device 3 at the above step (S31).

The core network device 3 can determine the first information based on the received third information (S33).

Further, the core network device 3 may determine the first information when the number of times of receiving the third information from the terminal device 1 becomes equal to or more than a predetermined number of times.

For example, when the third information indicates the longitude and latitude of the area where the terminal device 1 is located, the core network device 3 can determine, as first information, that the terminal device 1 is low mobility in the case where the longitude and latitude indicated by the third information are not changed more than a predetermined number of times or the changes are within a preset range.

Further, when the third information is the cell ID of a base station, the core network device 3 can determine, as first information, that the terminal device 1 is low mobility in the case where the cell ID indicated by the third information is not changed more than a predetermined number of times or the changes are within a preset range.

It should be noted that the above-described predetermined number of times and preset range can be freely set, for example, at the core network device 3.

Next, the core network device 3 transmits the first information to the base station 2 (S34).

The base station 2 determines the second information based on the first information (S35) and transmits the second information to the terminal device 1 (S36).

The second information according to the third example embodiment is the same as the second information described in the first example embodiment.

In this way, the terminal device 1 can receive, from the base station 2, information relating to scanning of base stations that is determined based on information relating to the mobility of the terminal device 1 itself.

According to the third example embodiment, the terminal device 1 can get a trigger of operation relating to scanning of base stations without consuming power not only for determining information relating to scanning of base stations, but also for determining information relating to the mobility of the terminal device 1 itself, on which the information relating to scanning of base stations is based. This can be done according to information relating to the mobility of the terminal device 1 itself or according to a variety of conditions. Further, in the third example embodiment, the process of determining the first information and transmitting the first information to the base station 2 is not required for the terminal device 1, avoiding the implementation of the terminal device to be complicated.

(A Fourth Example Embodiment)

Figure 8:
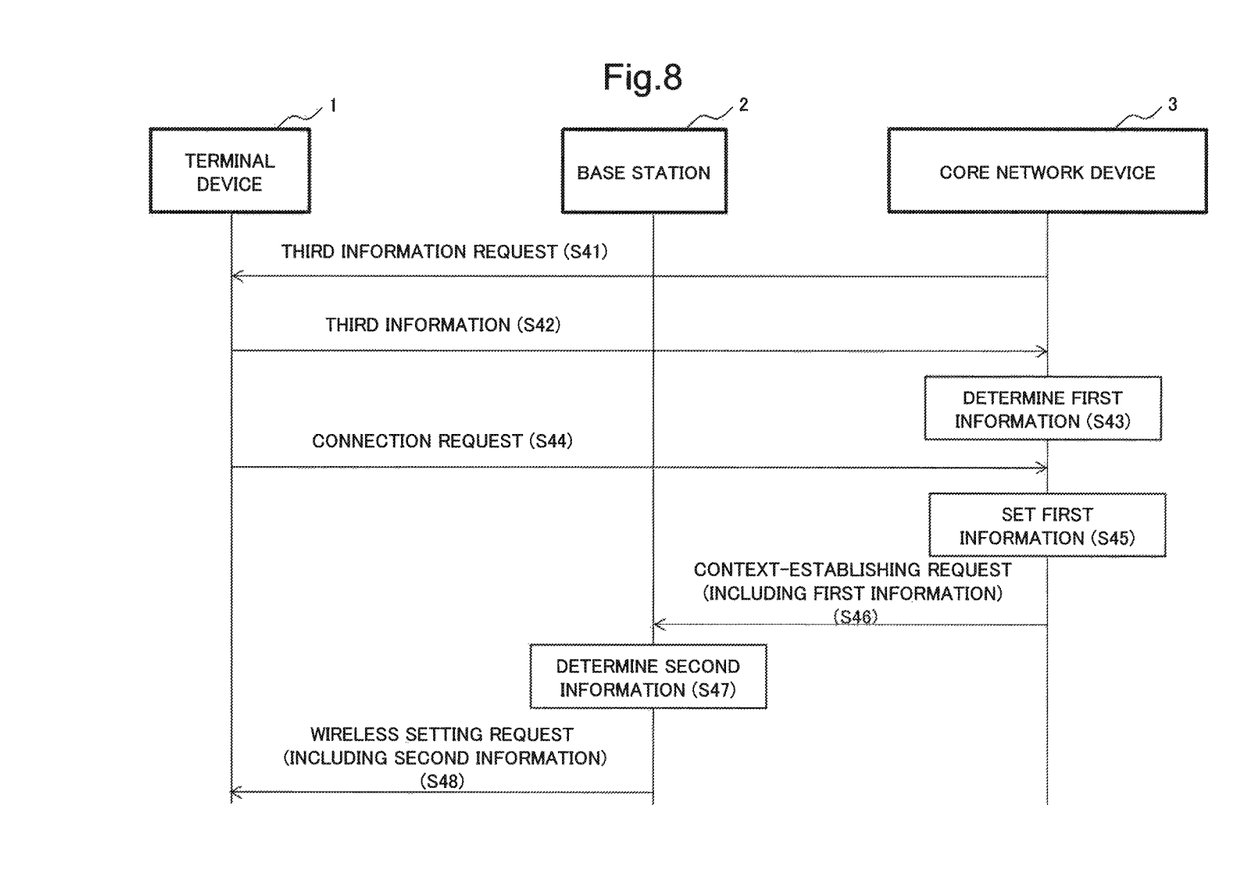
FIG. 8 is a sequence diagram illustrating operation according to an example embodiment of the present invention.

The operation according to a fourth example embodiment will be described using the sequence diagram of FIG. 8.

In the fourth example embodiment, second information is included in a wireless setting request message to be transmitted from the base station 2 to the terminal device 1.

In the operation of the fourth example embodiment, steps (S41) to (S43) are the same as steps (S31) to (S33) described in the third example embodiment.

With regard to the fourth example embodiment, the operation of step (S44) and thereafter will be described.

The terminal device 1 issues a service request to the core network device 3 (S44).

Next, the core network device 3 generates a context-establishing request message, and also sets first information in this message (S45). Here, the first information determined at step (S43) by the core network device 3 may be stored in the memory 315. In such a case, the control unit 313 may search the first information within the memory 315 in this step.

Then, the core network device 3 transmits the context-establishing request message to the base station 2 (S46). This message is the same as the one described in the second example embodiment.

Next, the base station 2 determines second information based on the first information (S47). The second information according to the fourth example embodiment is the same as the second information described in the first example embodiment.

The base station 2 transmits a wireless setting request message to the terminal device 1 (S48). This message is the same as the one described in the second example embodiment.

According to the fourth example embodiment, the terminal device 1 can get a trigger of operation relating to scanning of base stations without consuming power not only for determining information relating to scanning of base stations, but also for determining information relating to the mobility of the terminal device 1 itself, on which the information relating to scanning of base stations is based. This can be done according to information relating to the mobility of the terminal device 1 itself or according to a variety of conditions, and at a timing of receiving a wireless setting request message from the base station 2. Further, in the fourth example embodiment, the process of determining the first information and transmitting the first information to the base station 2 is not required for the terminal device 1, avoiding the implementation of the terminal device to be complicated.

So far, the example embodiments of the present invention have been described. The present invention is not limited to the above-described example embodiments and can be implemented with a variety of modifications within the scope of the spirit of the present invention. Those skilled in the art will understand that the above-described example embodiments are examples, that variations can be made to the combination of the example embodiments and the combination of the components and processes of the example embodiments, and that such variations are also within the scope of the present invention.

For example, the steps in the processing described in the present description are not necessarily executed in time series along with the sequences described in the sequence diagrams. For example, the steps in the processing may be executed in a sequence different from the sequence described in the sequence diagram or may be executed in parallel.

Further, the base station described in the present description may include components such as a communication processing unit, a request unit, an information acquisition unit, and/or a notification unit. Further, modules including these components (a base station device, or modules for a base station device, for example) may be provided. Moreover, a method including processing for implementing these components may be provided, or a program for causing a processor to execute the processing of the components may be provided. Further, a recording medium recording the program may be provided. As a matter of course, such modules, method, program, and recording medium are also included in the present invention.

Further, the terminal device described in the present description may have components such as a Radio Frequency (RF) transceiver, an antenna, a baseband processor, an application processor, and a memory, for example.

The RF transceiver performs analog RF signal processing for communicating with base stations. The analog RF signal processing performed by the RF transceiver may include frequency up-conversion, frequency down-conversion, and amplification. The RF transceiver may be linked to the antenna and the baseband processor. In other words, the RF transceiver may receive modulation symbol data (or Orthogonal Frequency Division Multiplexing (OFDM) symbol data) from the baseband processor, generate a transmission RF signal, and supply the transmission RF signal to the antenna. Further, the RF transceiver may generate a baseband reception signal based on the reception RF signal received by the antenna and supply the baseband reception signal to the baseband processor.

The baseband processor performs digital baseband signal processing (data plane processing) and control plane processing for wireless communications. The digital baseband signal processing may include such as: (a) data compression/restoration; (b) data segmentation/concatenation; (c) generation/decomposition of a transmission format (a transmission frame); (d) encryption/decryption of a transmission path; (e) modulation (symbol mapping)/demodulation; and (f) generation of OFDM symbol data (baseband OFDM signals) by Inverse Fast Fourier Transform (IFFT). On the other hand, the control plane processing may include communication management of layer 1 (e.g., transmission power control), layer 2 (e.g., wireless resource management and hybrid automatic repeat request (HARQ) processing), and layer 3 (e.g., signaling relating to attach, mobility, and call management).

For example, in the case of Long Term Evolution (LTE) and LTE-Advanced, the digital baseband signal processing by the baseband processor may include signal processing of a Packet Data Convergence Protocol (PDCP) layer, a Radio Link Control (RLC) layer, a Medium Access Control (MAC) layer, and a Physical (PHY) layer. Further, the control plane processing by the baseband processor may include the processing of a Non-Access Stratum (NAS) protocol, a Radio Resource Control (RRC) protocol, and a MAC Control Element (MAC CE).

The baseband processor may include a modem processor that performs digital baseband signal processing (e.g., Digital Signal Processor (DSP)) and a protocol stack processor that performs control plane processing (e.g., Central Processing Unit (CPU), or Micro Processing Unit (MPU)). In such a case, the protocol stack processor that performs control plane processing may be used in common with an application processor to be described later.

The application processor is also called as a CPU, MPU, microprocessor, or processor core. The application processor may include a plurality of processors (a plurality of processor cores). The application processor realizes a variety of functions of the terminal device by executing a system software program (Operating System (OS)) and a variety of application programs (a call application, a web browser, a mailer, a camera operation application, and a music reproduction application, for example) that are read out from the memory or another memory, not illustrated.

In some implementations, the baseband processor and the application processor may be integrated on a chip. In other words, the baseband processor and the application processor may be implemented as one System on Chip (SoC) device. The SoC device may also be called a system Large Scale Integration (LSI) or a chip set.

The memory is transitory memory, non-transitory memory, or a combination thereof. The memory may include a plurality of physically independent memory devices. The transitory memory is, for example, Static Random Access Memory (SRAM) or Dynamic RAM (DRAM), or a combination thereof. The non-transitory memory is mask Read Only Memory (MROM), Electrically Erasable Programmable ROM (EEPROM), flash memory, hard disk drive, or an arbitrary combination thereof. For example, the memory may include a baseband processor, an application processor, and an external memory device that can be accessed from SoC. The memory may include an internal memory device that is integrated in the baseband processor, the application processor, or SoC. Further, the memory may include a memory incorporated in a Universal Integrated Circuit Card (UICC).

The memory may store software modules (a computer program) that include a group of instructions and data for performing the processing by the terminal device described in the above-described plurality of example embodiments. In some implementations, the baseband processor or the application processor may be configured so as to perform the processing of the terminal device described in the above-described example embodiments by reading the software modules from the memory and executing the modules.

According to an aspect of the present invention, a base station determines the necessity of scanning according to a condition and instructs a terminal device whether to scan or not, to allow the terminal device to save power consumed by unnecessary scanning and power consumed for determining the necessity of scanning.

In this way, consumption power of the terminal device can be saved.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

SUPPLEMENTARY NOTE

The whole or part of the example embodiments disclosed above can be described as, but not limited to, the following supplementary notes.
(Supplementary Note 1)
A terminal device that wirelessly communicates with a base station, wherein the terminal device receives, from the base station that receives first information relating to mobility of the terminal device, second information relating to scanning of base stations that is determined by the base station based on the first information.
(Supplementary Note 2)
The terminal device according to Supplementary Note 1, wherein the first information indicates that a degree of the mobility of the terminal device is equal to or less than a preset threshold.
(Supplementary Note 3)
The terminal device according to Supplementary Note 1 or 2,
wherein the second information is information for instructing not to scan base stations.
(Supplementary Note 4)
The terminal device according to Supplementary Note 1,
wherein the second information is information for instructing not to scan base stations, when the first information indicates that a degree of the mobility of the terminal device is equal to or less than a preset threshold.
(Supplementary Note 5)
The terminal device according to any one of Supplementary Notes 1 to 4,
wherein the first information is determined based on third information relating to a position of the terminal device.
(Supplementary Note 6)
The terminal device according to any one of Supplementary Notes 1 to 5,
wherein the second information is included in a wireless setting request message to be transmitted to the terminal device.
(Supplementary Note 7)
The terminal device according to any one of Supplementary Notes 1 to 6,
wherein the first information is determined by a core network device.
(Supplementary Note 8)
The terminal device according to any one of Supplementary Notes 5 to 7,
wherein the terminal device transmits the third information to the core network device.
(Supplementary Note 9)
A core network device in a wireless communication system,
wherein the core network device transmits, to a base station, first information relating to mobility of a terminal device; and
the base station transmits, to the terminal device, second information relating to scanning of base stations.
(Supplementary Note 10)
The core network device according to Supplementary Note 9,
wherein the first information indicates that a degree of the mobility of the terminal device is equal to or less than a preset threshold.
(Supplementary Note 11)
The core network device according to Supplementary Note 9 or 10, wherein the second information is information for instructing not to scan base stations.
(Supplementary Note 12)
The core network device according to Supplementary Note 9,
wherein the second information is information for instructing not to scan base stations, when the first information indicates that a degree of the mobility of the terminal device is equal to or less than a preset threshold.
(Supplementary Note 13)
The core network device according to any one of Supplementary Notes 9 to 12,
wherein the first information is determined based on third information relating to a position of the terminal device.
(Supplementary Note 14)
The core network device according to any one of Supplementary Notes 9 to 13,
wherein the second information is included in a wireless setting request message to be transmitted to the terminal device.
(Supplementary Note 15)
The core network device according to any one of Supplementary Notes 9 to 14,
wherein the core network device determines the first information.
(Supplementary Note 16)
The core network device according to any one of Supplementary Notes 13 to 15,
wherein the core network device receives the third information from the terminal device.

The invention claimed is:
1. A base station that wirelessly communicates with a terminal device, the base station comprising:
  a reception unit implemented at least by hardware including a processor and memory and for receiving first information relating to mobility of the terminal device, the first information being information relating to a position of the terminal device or information indicating a degree of mobility of the terminal device, the degree of mobility being calculated based on the position of the terminal device and indicating how mobile the terminal device is;
  a determination unit implemented at least by the hardware and for determining second information relating to scanning of base stations based on the first information; and
  a transmission unit implemented at least by the hardware and for transmitting the second information to the terminal device,
  wherein the terminal device performs scanning to determine if there is another base station emitting stronger signals than the base station, the scanning performed based on the second information.
2. The base station according to claim 1,
wherein the first information indicates that the degree of the mobility of the terminal device is equal to or less than a preset threshold.
3. The base station according to claim 1, wherein the second information is information for instructing not to scan base stations.
4. The base station according to claim 1,
wherein the second information is information for instructing not to scan base stations, when the first information indicates that the degree of the mobility of the terminal device is equal to or less than a preset threshold.

5. The base station according to claim 1, wherein the first information is determined by a core network device based on third information relating to a position of the terminal device.

6. The base station according to claim 5, wherein the third information is transmitted from the terminal device to the core network device.

7. The base station according to claim 1, wherein the second information is included in a wireless setting request message to be transmitted to the terminal device.

8. A terminal device that wirelessly communicates with a base station,
wherein the terminal device receives, from the base station that receives first information relating to mobility of the terminal device, second information relating to scanning of base stations that is determined by the base station based on the first information; wherein
the first information is information relating to a position of the terminal device or information indicating a degree of mobility of the terminal device, and the degree of mobility is calculated based on the position of the terminal device and indicates how mobile the terminal device is,
wherein the terminal device performs scanning to determine if there is another base station emitting stronger signals than the base station, the scanning performed based on the second information.

9. A core network device in a wireless communication system,
wherein the core network device transmits, to a base station, first information relating to mobility of a terminal device, the first information being information relating to a position of the terminal device or information indicating a degree of mobility of the terminal device indicating how mobile the terminal device is, and being determined by the core network device based on third information which relates to a position of the terminal device and is transmitted from the terminal device to the core network device; and
the base station transmits, to the terminal device, second information relating to scanning of base stations,
wherein the terminal device performs scanning to determine if there is another base station emitting stronger signals than the base station, the scanning performed based on the second information.

* * * * *